United States Patent Office 3,644,344
Patented Feb. 22, 1972

---

3,644,344
NITROFURYLACRYLIDENE DERIVATIVES
Max J. Mousseron, Montpellier, Herault, France, assignor to Etablissements Clin-Byla, Paris, France
No Drawing. Filed July 2, 1969, Ser. No. 838,656
Claims priority, application France, July 5, 1968, 158,054
Int. Cl. C07d 49/30, 51/42
U.S. Cl. 260—240 A
3 Claims

---

ABSTRACT OF THE DISCLOSURE (5-nitrofuryl-2)acrylidene derivatives of a cyclic urea having the formula

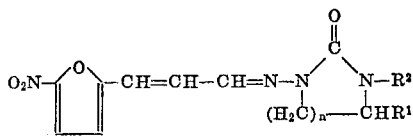

in which $n$ is 1 or 2, $R^1$ is hydrogen or lower alkyl and $R^2$ is hydrogen or a carbamoyl group of the formula —C:O—NHA in which A is alkyl, alkenyl, aryl, haloaryl, polyhaloaryl, acyl, haloacyl, polyhaloacyl, aroyl, haloaroyl or polyhaloaroyl, have pharmacological properties which render them useful in combatting staphylococci, streptococci and in salmonellosis.

---

The present invention relates to a new series of chemical compounds derived from (5-nitrofuryl-2)acrolein and 1-amino-imidazolidin-2-ones or 1-amino-3,4,5,6-tetrahydro-pyrimidine-2-ones and which may carry substituents.

These products have a remarkable antibacterial activity both "in vitro" and "in vivo" against a very large number of Gram positive and Gram negative pathogenic bacteria and can therefore be used in human and veterinary medicine and for disinfectant purposes and for sterilising instruments.

The present invention provides a substituted imidazolidin-2-one or tetrahydropyrimidin-2-one having the general formula

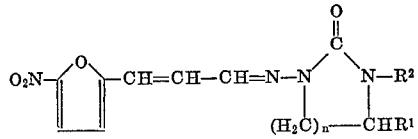

in which $n$ is 1 or 2, $R^1$ is a hydrogen atom or a lower alkyl group and $R^2$ is a hydrogen atom, or a carbamoyl group having the general formula

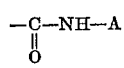

in which A is an alkyl, alkenyl, aryl, haloaryl, acyl, haloacyl, aroyl or haloaroyl group.

Of the compounds of the invention 1-(5-nitrofuryl-2-acrylidene)-aminoimidazolidin - 2 - one (10.939), 1-(5-nitrofuryl-2-acrylidene)-amino - 4 - methylimidazolidin-2-one (11.286) and 1-(5-nitrofuryl-2-acrylidene)-amino-3,4,5,6-tetrahydropyrimidin-2-one (11.242) may, for example, be used as intermediates for the synthesis of the other compounds in accordance with the present invention. They may be prepared by condensing (5-nitrofuryl-2)-acrolein with 1-aminoimidazolidin-2-one, 1-amino-4-methylimidazolidin-2-one or 1-amino-3,4,5,6-tetrahydropyrimidin-2-one according to the following general reaction scheme:

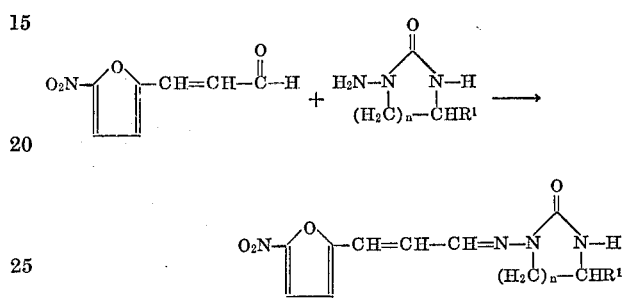

in which $R^1$ is as previously defined.

The 5-nitrofurylacrolein is preferably supplied to the process in alcoholic solution and the 1-aminoimidazolidin-2-one or 1-aminotetrahydropyrimidin-2-one derivative in aqueous solution.

Thus, a hot alcoholic solution of (5-nitrofuryl-2)-acrolein may be added to an aqueous solution of 1-aminoimidazolidin-2-one or 1-amino-3,4,5,6-tetrahydropyrimidin-2-one containing a known amount thereof, the pH of the aqueous solution being between 1 and 5. The heating time is 5 to 30 minutes depending upon the rate of reaction. The ethyl alcohol may be replaced by other solvents in which (5-nitrofuryl-2)-acrolein is soluble provided that they are miscible with water; examples include propyl alcohol and dimethylformamide. The process may also be carried out in a heterogeneous phase, that is to say solid (5-nitrofuryl-2)-acrolein may be added to the aqueous solution of the 1-aminoimidazolidin-2-one or of the 1-aminotetrahydropyrimidin-2-one, in which case vigorous stirring and a longer heating time is necessary in order to bring about complete reaction. An exchange reaction between 1-benzaldimino-imidazolidin-2-one and (5-nitrofuryl-2)-acrolein may also be carried out. In this case, it is sufficient to suspend 1-benzaldimino-imidazolidin-2-one in 10% aqueous sulphuric acid and to steam distil the liberated benzaldehyde. The solution obtained is then condensed with (5-nitrofuryl-2)-acrolein by one of the methods indicated above.

The compounds having the last general formula given above, are treated with an alkyl haloalkyl, alkenyl, acyl, haloacyl, aryl, haloaryl, aroyl, or haloaroyl isocyanate to yield the corresponding 3-carbamoyl derivative according to the following general reaction scheme:

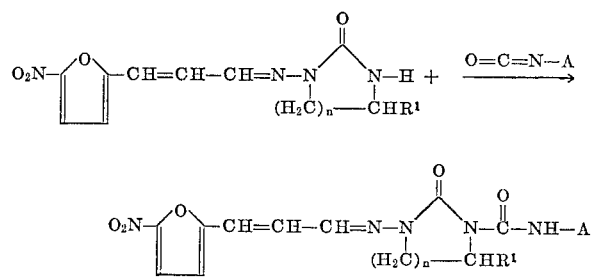

in which A is an alkyl, alkenyl, acyl, haloacyl, aryl, haloaryl, aroyl or haloaroyl group. The haloacyl, haloaryl and haloaroyl group may contain more than one halogen atom.

The reaction may in general be carried out in a diluent which is inert with respect to the isocyanate used, for example dimethylformamide, dimethylsulphoxide, benzene or toluene, in homogeneous phase (where all the reactants are in solution) or heterogeneous phase (suspension). Substantially anhydrous conditions are preferred. The isocyanate is used either in an equimolecular quantity with respect to the nitrofuran derivative or in excess depending upon the degree of reactivity of the latter. The heating times are variable. They may vary from 10 minutes to 4 hours depending upon the rate of reaction. The same applies to the temperature, which may vary from 60° C. to 160° C.

In some cases, the reaction product is isolated by crystallisation directly from the reaction medium after standing at room temperature or at 0° C., or by the addition to the reaction medium of a second solvent in which the reaction product is insoluble and which either brings about precipitation or crystallisation. In certain cases the reaction product may also be isolated by evaporating the solvent under reduced pressure and taking up the residue in another solvent.

The following examples illustrate the preparations of typical compounds of the invention.

EXAMPLE 1

1-(5-nitrofuryl-2-acrylidene)-aminoimidazolidin-2-one (10.939)

(a) 28 litres of an aqueous solution of 1-aminoimidazolidin-2-one sulphate at pH 1 adjusted to a concentration of 0.237 mol per litre are introduced into a Grignard reactor of 50 litres capacity made of enamelled cast iron. The solution is heated to 75° C. 1 kg. of (5-nitrofuryl-2) acrolein (6 mols) in solution in 5 litres of boiling ethanol is rapidly added (the addition takes 10 minutes). The reaction medium is stirred for 15 minutes at 75 to 80° C. An abundant orange yellow precipitate rapidly separates. The reaction mixture is cooled to 20° C. and the precipitate is separated from the liquid. It is then suspended in 20 litres of water in the Grignard reactor. It is heated with stirring until the water boils and the reaction medium is then filtered off hot. The solid is suspended in 15 litres of boiling ethyl alcohol and the hot suspension is then again filtered. The solid thus obtained is dried under reduced pressure at 85° C. 1400 g. of an orange yellow pulverulent substance is obtained in 93.5% yield; it melts with decomposition at 280° C.

(b) 2.8 litres of a solution of 1-aminoimidazolidin-2-one sulphate at pH 3 are introduced into a 4 litre flask equipped with an efficient stirrer, and 100 g. of solid (5-nitrofuryl-2) acrolein are then added all at once. The reaction medium is heated with stirring for 2 hours at 90 to 100° C. It is then left to stand for 2 hours at room temperature. The solid is filtered off, washed with 1 litre of hot water and then suspended in 1 litre of boiling alcohol and finally filtered off with suction. After drying under reduced pressure at 100° C., 125 g. of an orange yellow solid is obtained which melts with decomposition at 280° C.

(c) 189 g. (1 mol) of 1-benzaldimino-imidazolidin-2-one and 1 litre of a 10% aqueous solution of sulphuric acid are introduced into a 4 litre flask which is provided with an inlet for steam. The reaction mixture is steam distilled until removal of benzaldehyde is complete (about 2 hours). The clear solution obtained contains 1 mol of 1-aminoimidazolidin-2-one sulphate. 160 g. of (5 nitrofuryl-2)acrolein dissolved in 1 litre of boiling alcohol are then introduced. The reaction medium is heated for 10 minutes with stirring at 80 to 90° C. and then left to stand for 2 hours. The solid is removed by suction filtration, washed with a small amount of water and then with 1 litre of boiling alcohol and dried under reduced pressure at 90° C. 220 g. of an orange yellow solid which melts with decomposition at 280° C. are obtained.

EXAMPLE 2

1-(5-nitrofuryl-2-acrylidene)amino-3-(N-methylcarbamoyl)-imidazolidin-2-one (11.380)

The following are successively introduced into a glass reaction vessel of 20 litres capacity equipped with an efficient stirrer, a condenser and a thermometer which plunges into the reaction medium: 1 kg. of 1-(5-nitrofuryl-2-acrylidene)aminoimidazolidin-2-one, 8 litre of anhydrous dimethyl formamide and 0.430 litre of methyl isocyanate.

The rection medium is heated gradually to 120° C. (time taken for heating up 1 hour). The reactants are observed to dissolve progressively in the medium as the temperature rises. Heating is continued for 2 hours at 120° C. (complete solution) and the temperature is then lowered to 100° C. This temperature is maintained for a further 2 hours. The reaction medium is cooled and kept at 0° C. overnight. A solid crystallises out under these conditions. It is filtered off with suction and washed abundantly with diethyl ether. The crystals are crushed into a fine powder. The solid is dried under reduced pressure at 80 to 85° C.

963 g. (yield 79.5%) of an ochre yellow pulverulent solid which melts with decomposition at 268 to 270° C. are obtained.

EXAMPLE 3

1-(5-nitrofuryl-2-acrylidene)amino-3-(N-ethylcarbamoyl)imidazolidin-2-one (11.295)

25 g. of 1-(5-nitrofuryl-2-acrylidene)amino-imidazolidin-2-one, 200 ml. of anhydrous dimethylformamide and 25 ml. of ethyl isocyanate are introduced into a 500 ml. flask equipped with thermometer, efficient stirrer and condenser. The reaction medium is heated at 100° C. for one hour and the temperature is then gradually raised to 130° C. and held thereat for a short time (5 minutes) until a homogeneous solution is obtained. Heating is continued for one hour at 100° C. 5 g. of animal charcoal are introduced and the reaction medium is filtered off hot; on cooling the filtrate, a light yellow solid crystallises. It is centrifuged and then washed successively in 100 ml. of water, 100 ml. of alcohol and lastly 100 ml. of diethyl ether by placing it successively suspending it in these solvents. The product is finally dried under resduced pressure at 80 to 90° C. 21 g. of a yellow solid which melts at 245–246° C. with decomposition are thus obtained.

EXAMPLE 4

1-(5-nitrofuryl-2-acrylidene)amino-3-(N-carbamoyl) imidazolidin-2-one (11.393)

2.5 g. of 1-(5-n trofuryl-2-acrylidene)aminoimidazolidin-2-one, 20 ml. of anhydrous dimethylformamide and 3 ml. of propyl isocyanate are heated to boiling under reflux for 3 hours (temperature of the bath: 160° C.). The rection mixture is then left to cool to 100° C., 2 g. of charcoal are introduced, and the reaction mixture is again heated to boiling under reflux for 1 or 2 minutes. The charcoal is filtered off hot and on cooling the filtrate, a well crystallised solid slowly separates out. After being left to stand overnight, the solid is filtered off, washed with water, alcohol and diethyl ether and dried. 1.6 g. of a solid crystallised into well formed ochre yellow platelets which melt at 222 to 224° C. with decomposition are thus obtained.

EXAMPLE 5

1-(5-nitrofuryl-2-acrylidene)amino-4-methyl-imidazolidin-2-one (11.286)

19 g. of (5-nitrofuryl-2)acrolein in solution in 150 ml. of hot methanol are added to 700 ml. of a solution of 1-amino-4-methylimidazolidin-2-one sulphate adjusted to a concentration of $1.6 \times 10^{-4}$ mol/ml. (i.e. containing 0.126 mol) at pH 3 and 70° C. The mixture thus obtained is heated on a boiling water bath for 10 minutes with stirring. A red precipitate rapidly forms. The reaction mixture is cooled to 0° C. and kept at this temperature for 2 hours. The solid is filtered off and successively washed by suspending it with stirring in 100 ml. of hot water, 100 ml. of hot alcohol, 50 ml. of boiling benzene and lastly 100 ml. of diethyl ether, and it is then dried under reduced pressure at 100° C.

22 g. of an orange yellow pulverulent powder which melts at 238 to 240° C. with decomposition are thus obtained.

EXAMPLE 6

1-(5-nitrofuryl-2-acrylidene)amino-3-(N-methylcarbamoyl)-4-methylimidazolidin-2-one (11.438)

2.5 g. of 1-(5-nitrofuryl-2-acrylidene)amino-4-methyl imidazolidin-2-one, 20 ml. of anhydrous dimethylformamide and 4 ml. of methyl isocyanate are heated for 3 hours at 140° C. (temperature of the bath). The reaction medium is then left to stand overnight at room temperature. Under these conditions a solid crystallises from the reaction medium. The solid is filtered off, washed with water, alcohol and diethyl ether and then dried under reduced pressure at 95° C. 1.75 g. of a bright yellow, well crystallised solid which melts at 221° C. with decomposition are thus obtained.

EXAMPLE 7

1-(5-nitrofuryl-2-acrylidene)amino-3-(N-ethylcarbamoyl)-4-methylimidazolidin-2-one (11.439)

Starting from 2.5 g. of 1-(5-nitrofuryl-2-acrylidene)amino-4-methylimidazolidin-2-one, 20 ml. of dimethylformamide and 4 ml. of ethyl isocyanate and following the procedure described in Example 6, 1.9 g. of a well crystallised light yellow solid which melts at 227 to 228° C. with decomposition are obtained.

EXAMPLE 8

1-(5-nitrofuryl-2-acrylidene)amino-3-(N-n-propylcarbamoyl)-4-methylimidazolidin-2-one (11.440)

Starting from 2.5 g. of 1-(5-nitrofuryl-2-acrylidene)amino-4-methylimidazolidin-2-one, 10 ml. of dimethylformamide and 2 ml. of n-propyl isocyanate and following the procedure described in Example 6, 2.1 g. of a well crystallised solid in the form of lemon yellow platelets which melt at 188 to 190° C. are obtained.

EXAMPLE 9

1-(5-nitrofuryl-2-acrylidene)amino-3-(N-n-butylcarbamoyl)-4-methylimidazolidin-2-one (11.500)

2.5 g. of 1-(5-nitrofuryl-2-acrylidene)amino-4-methyl imidazolidine-2-one, 10 ml. of anhydrous dimethylformamide and 3 ml. of n-butyl isocyanate are heated for 3 hours at 140° C. The reaction medium is left to stand at room temperature overnight. No solid is deposited under these conditions. 20 g. of crushed ice are introduced; an abundant precipitate rapidly forms. The reaction medium is left to stand for 2 hours. The solid is filtered off, taken up in 100 ml. of alcohol and heated to boiling under reflux. 2 to 3 g. of charcoal are introduced, reflux is continued for 2 to 3 minutes and the reaction mixture is filtered hot. On vigorously cooling the filtrate (−20° C.), a well crystallised solid in the form of orange yellow platelets is deposited. The solid is filtered off, washed with diethyl ether and dried at 50° C. under reduced pressure. 1.8 g. of a product which melts at 152 to 153° C. is thus obtained.

EXAMPLE 10

1-(5-nitrofuryl-2-acrylidene)amino-3,4,5,6-tetrahydropyrimidin-2-one (11.242)

30 g. of (5-nitrofuryl-2)acrolein in solution in 300 ml. of boiling methanol are introduced into 300 ml. of an aqueous solution containing 0.2 mol of 1-amino-3,4,5,6-tetrahydropyrimidin-2-one sulphate at pH 2 and 70° C. The reaction medium is heated on a boiling water bath for 10 minutes, rapidly cooled and left to stand for 2 hours. The solid is filtered off, taken up in 100 ml. of water, heated on a boiling water bath for a short time (5 to 10 minutes), filtered hot and washed with a little alcohol (50 ml.) and then taken up in 100 ml. of boiling benzene, filtered hot and finally washed with diethyl ether. 26 g. of an orange yellow pulverulent solid which melts at 230 to 232° C. with decomposition are obtained.

EXAMPLE 11

1-(5-nitrofuryl-2-acrylidene)amino-3-(N-methylcarbamoyl)-3,4,5,6-tetrahydropyrimidin-2-one (11.425)

2 g. of 1-(5-nitrofuryl - 2 - acrylidene)amino-3,4,5,6-tetrahydropyrimidin-2-one, 20 ml. of anhydrous dimethylformamide and 3 ml. of methyl isocyanate are heated for one hour at 120° C. (temperature of the bath).

A small quantity of insoluble material is removed from the reaction medium by filtering whilst hot. After cooling the filtrate (overnight at −10° C.), a well crystallised solid is deposited. It is filtered off, washed with water, alcohol and ether and finally dried. 1.9 g. of a well crystallised product in the form of golden yellow platelets melting at 233 to 235° C. with decomposition are thus obtained.

EXAMPLE 12

1-(5-nitrofuryl-2-acrylidene)amino-3-(N-ethylcarbamoyl)-3,4,5,6-tetrahydropyrimidin-2-one (11.430)

5 g. of 1-(5-nitrofuryl-2-acrylidene)amino-3,4,5,6-tetrahydropyrimidine - 2 - one, 25 ml. of anhydrous dimethylformamide and 5 ml. of ethyl isocyanate are heated for 3 hours with stirring at 130° C. (temperature of the bath). On cooling to room temperature, a well formed crystallisate of golden yellow platelets is deposited. The reaction medium is left to stand at room temperature for 2 hours and the solid is filtered off and washed with water, alcohol and diethyl ether. 4.5 g. of a well crystallised solid which melts at 215 to 216° C. with decomposition are collected.

EXAMPLE 13

1-(5 - nitrofuryl - 2 - acrylidene)amino-3-(N-n-propylcarbamoyl)-3,4,5,6-tetrahydropyrimidin-2-one (11.431)

5 g. of 1 - (5-nitrofuryl-2-acrylidene)amino-3,4,5,6-tetrahydropyrimidin-2-one, 25 ml. of anhydrous dimethylformamide and 5 ml. of n-propyl isocyanate are treated in the manner described in Example 12. 3.2 g. of a solid in the form of well crystallised golden yellow platelets

EXAMPLE 14

1-(5-nitrofuryl-2-acrylidene)amino-3-(N-allylcarbamoyl)-3,4,5,6-tetrahydropyrimidin-2-one (11.432)

On replacing n-propylisocyanate by n-butylisocyanate (5 ml.) in the preceding example and proceeding as described in that example, 2.8 g. of a well crystallised solid in the form of yellow platelets which melt at 185 to 186° C. are obtained.

EXAMPLE 15

1-(5-nitrofuryl-2-acrylidene)amino-3-(N-allylcarbamoyl) imidazolidin-2-one (11.394)

12.5 g. of 1 - (5-nitrofuryl-2-acrylidene)amino-imidazolidin-2-one, 80 ml. of anhydrous dimethylformamide and 12.5 ml. of allyl isocyanate are heated for 1.5 hours on an oil bath at 160° C. with stirring. The product is observed to dissolve with an intense black coloration. The temperature is reduced to 100° C. and 8 g. of animal charcoal are introduced. This temperature is maintained for 5 minutes and the charcoal is filtered off. On cooling the filtrate, a well crystallised solid is deposited. The reaction medium is left to stand overnight at 0° C. The solid is filtered off, thoroughly washed with water, alcohol and diethyl ether and then dried at 100° C. under reduced pressure. 11 g. of a bright yellow solid which melts at 239 to 241° C. with decomposition are thus obtained.

EXAMPLE 16

1-(5-nitrofuryl-2-acrylidene)amino-3-(N-allylcarbamoyl)-4-methylimidazolidin-2-one (11.435)

2.5 g. of 1 - (5-nitrofuryl-2-acrylidene)amino-4-methyl-imidazolidin-2-one, 15 ml. of anhydrous dimethylformamide and 3 ml. of allyl isocyanate are heated for 3 hours at 120° C. The reaction mixture is kept at −10° C. overnight. A crystalline solid is deposited. It is filtered off, washed with water, alcohol and diethyl ether and then dried. 2.2 g. of a yellow crystalline solid in the form of prismatic crystals which melt at 210 to 212° C. with decomposition are obtained.

EXAMPLE 17

1-(5-nitrofuryl-2-acrylidene)amino-3-(N-allylcarbamoyl)-3,4,5,6-tetrahydropyrimidin-2-one (11.433)

5 g. of 1 - (5-nitrofuryl-2-acrylidene)amino-3,4,5,6-tetrahydropyrimidin - 2 - one, 25 ml. of dimethylformamide and 6 ml. of allyl isocyanate are heated for 1.25 hours at 120° C. At the end of this time, a small quantity of insoluble material is removed by filtration whilst hot. As the temperature of the filtrate returns to room temperature, solid well crystallised bright yellow platelets are deposited. The reaction medium is held overnight at room temperature and the product then filtered off, washed with water, alcohol and diethyl ether and then dried at 100° C. under reduced pressure. 3.8 g. of a solid which melts at 215 to 216° C. with decomposition are obtained.

EXAMPLE 18

1-(5-nitrofuryl - 2 - acrylidene)amino-3-(N-phenylcarbamoyl)-imidazolidin-2-one (11.313)

2.5 g. of 1 - (5-nitrofuryl-2-acrylidene)amino-imidazolidin-2-one, 20 ml. of anhydrous dimethylformamide and 5 ml. of phenyl isocyanate are heated with stirring at 110° C. for 2 hours. The solid is seen to dissolve, followed by a reprecipitation in the course of heating. The reaction medium is left to stand overnight and the solid is filtered off, washed abundantly with diethyl ether and dried at 80° C. under reduced pressure. 2.8 g. of a brillant light yellow solid which melts at 290° C. with decomposition are thus obtained.

EXAMPLE 19

1-(5-nitrofuryl-2-acrylidene)amino-3-(N-β-naphthylcarbamoyl)-imidazolidin-2-one (11.327)

2.5 g. of 1 - (5-nitrofuryl-2-acrylidene)amino-imidazolidin-2-one, 20 ml. of anhydrous dimethylformamide and 1.7 g. of β-naphthyl isocyanate are heated with stirring for 2 hours at 80° C. The reaction mixture is left to stand at room temperature for 4 hours and the solid is then filtered off and abundantly washed with diethyl ether. 3 g. of an orange yellow solid which melts with decomposition at 255 to 258° C. are thus obtained.

EXAMPLE 20

1-(5-nitrofuryl-2-acrylidene)amino-3-(N-phenylcarbamoyl)-4-methylimidazolidin-2-one (11.501)

When in Example 18 the imidazolidin-2-one derivative is replaced by 1-(5-nitrofuryl - 2 - acrylidene) amino-4-methyl imidazolidin-2-one (2.5 g.) and the procedure otherwise remains unchanged, 2.8 g. of an orange yellow solid which melts at 245–246° C. with decomposition are obtained.

EXAMPLE 21

1-(5-nitrofuryl-2-acrylidene)amino-3-(N-para-chlorophenylcarbamoyl)imidazolidin-2-one (11.546)

2.5 g. of 1-(5-nitrofuryl-2-acrylidene)amino-imidazolidin-2-one, 20 ml. of anhydrous dimethylformamide and 4.5 g. of parachlorophenyl isocyanate are heated for 2 hours at 120° C. with stirring. The solid dissolves completely under these conditions. The reaction mixture is kept overnight at 0° C. A solid crystallises out: it is filtered off, washed with diethyl ether and dried at 80° C. under reduced pressure. The yield is 2.8 g. of a brilliant yellow solid the melting point or decomposition point of which is above 300° C.

EXAMPLE 22

1-(5-nitrofuryl-2-acrylidene)amino-3-(N-meta-chlorophenylcarbamoyl)imidazolidin-2-one (11.547)

2.5 g. of 1-(5-nitrofuryl-2-acrylidene)amino-imidazolidin-2-one, 35 ml. of anhydrous dimethylformamide and 5 ml. of meta-chlorophenyl isocyanate are heated with stirring for 2 hours at 100° C., one hour at 120° C. and finally 5 minutes at 160° C. Under these conditions, the solid dissolved completely. On cooling the solution and keeping it overnight at 0° C., a solid crystallises out. This solid is filtered off, washed with diethyl ether and dried under reduced pressure at 80° C. 2.97 g. of a yellow solid which melts at 282-283° C. with decomposition are obtained under these conditions.

EXAMPLE 23

1-(5-nitrofuryl-2-acrylidene)amino-3-(N-ortho-chlorophenylcarbamoyl)imidazolidin-2-one (11.548)

2.5 g. of 1 - (5 - nitrofuryl - 2 - acrylidene)amino imidazolidin-2-one are dissolved in 35 ml. of anhydrous dimethylformamide at 160° C. The reaction mixture is left to cool to 140° C. and 5 ml. of o-chlorophenyl isocyanate are added. The reaction mixture is stirred for one hour at 120° C. and then for 2 hours at 100° C. On cooling the reaction mixture to 0° C., a salmon pink solid is deposited. It is filtered off, washed with ether and dried at 80° C. under vacuum. 2.43 g. of a solid which melts at 270 to 271° C. with decomposition are recovered.

EXAMPLE 24

1-(5-nitrofuryl-2-acrylidene)amino-3-(N-phenylcarbamoyl)-3,4,5,6-tetrahydropyrimidin-2-one (11.434)

2.5 g. of 1-(5-nitrofuryl-2-acrylidene)amino - 3,4,5,6-tetrahydropyrimidin-2-one, 15 ml. of anhydrous dimethylformamide and 3 ml. of phenyl isocyanate are heated for 3 hours on an oil bath at 120° C.

The reaction mixture is left to stand overnight at room temperature and the solid is then filtered off, washed with alcohol and diethyl ether and then dried. 2.6 g. of a solid crystallise in the form of orange yellow needles which melt at 227 to 228° C. with decomposition.

EXAMPLE 25

1-(5-nitrofuryl-2-acrylidene)amino-3-(N-acetylcarbamoyl)imidazolidin-2-one (11.663)

2.5 g. of 1-(5-nitrofuryl-2-acrylidene)amino-imidazolidin-2-one and 40 ml. of a solution of 3 g. of acetyl isocyanate and 40 ml. of anhydrous dimethylformamide are heated in benzene to boiling under reflux for one hour. A homogeneous solution is obtained under these conditions after heating for 0.5 hour. The reaction mixture is then evaporated to dryness under reduced pressure (bath temperature 60 to 70° C.) and the residue is taken up in 25 ml. of water. A canary yellow solid is obtained which is filtered off, washed with alcohol and diethyl ether and then dried at 60 to 70° C. under reduced pressure.

2.8 g. of a solid which melts at 252 to 253° C. with decomposition are obtained.

EXAMPLE 26

1-(5-nitrofuryl-2-acrylidene)amino-3-(N-acetylcarbamoyl)-4-methylimidazolidin-2-one (11.664)

The procedure is the same as that described in Example 25, using 2.5 g. of 1-(5-nitrofuryl-2-acrylidene)amino-4-methylimidazolidin-2-one; 2.8 g. of an orange yellow solid which melts at 220 to 222° C. with decomposition are obtained.

EXAMPLE 27

1-(5-nitrofuryl-2-acrylidene)amino-3-(N-acetylcarbamoyl)-3,4,5,6-tetrahydropyrimidin-2-one (11.680)

2.5 g. of 1-(5-nitrofuryl-2-acrylidene)amino - 3,4,5,6-tetrahydropyrimidin-2-one and 40 ml. of a solution in benzene of 3 g. of acetyl isocyanate and 30 ml. of anhydrous dimethylformamide are heated for 30 minutes at 100° C. Complete solution is obtained under these conditions. The solution obtained is evaporated to dryness under reduced pressure and the residue is taken up in 25 ml. of water. A semicrystalline precipitate is thus obtained which is in turn taken up in 25 ml. of boiling alcohol. Under these conditions, an ochre yellow pulverulent solid is obtained which is filtered off, washed with diethyl ether and dried under reduced pressure at 80° C. 2.1 g. of a solid which melts at 195 to 198° C. with decomposition are obtained.

EXAMPLE 28

1-(5-nitrofuryl-2-acrylidene)amino-3-(N-fluoroacetylcarbamoyl)imidazolidin-2-one (11.553)

2.5 g. of 1-(5-nitrofuryl-2-acrylidene)imidazolidin - 2-one, 20 ml. of anhydrous dimethylformamide and 2.5 ml. of fluoroacetyl isocyanate are stirred together for one hour at room temperature. Reaction is brought about by heating for 10 minutes at 100° C. The reaction mixture is then left to stand overnight at room temperature and is then filtered. The solid is washed successively with water, alcohol and diethyl ether and then dried at 80° C. under reduced pressure. 2.8 g. of a lemon yellow pulverulent solid which melts at 254–255° C. with decomposition are thus obtained.

EXAMPLE 29

1-(5-nitrofuryl-2-acrylidene)amino-3-(N-fluoroacetylcarbamoyl)-4-methylimidazolidin-2-one (11.601)

2 g. of 1-(5-nitrofuryl-2-acrylidene)amino-4-methylimidazolidin-2-one, 10 ml. of anhydrous dimethylformamide and 1.5 ml. of fluoroacetyl isocyanate are stirred with a magnetic stirrer for 2 hours at room temperature. The reaction mixture is then heated to 80° C. for 30 minutes and then kept overnight at 0° C. Under these conditions, a canary yellow solid is obtained which is filtered off, washed with water, alcohol and diethyl ether and then dried at 80° C. under reduced pressure. 1.9 g. of a solid which melts at 226 to 228° C. with decomposition is collected.

EXAMPLE 30

1-(5-nitrofuryl-2-acrylidene)amino-3-(N-fluoroacetylcarbamoyl)-3,4,5,6-tetrahydropyrimidin-2-one (11.600)

The procedure described in Example 29 is followed but the imidazolidin-2-one used is replaced by 2 g. of 1-(5-nitrofuryl - 2 - acrylidene)amino-3,4,5,6-tetrahydropyrimidin-2-one: 1.8 g. of a pale yellow pulverulent solid which melts at 192 to 194° C. is obtained.

EXAMPLE 31

1-(5-nitrofuryl-2-acrylidene)amino-3-N-chloroacetylcarbamoyl)-imidazolidin-2-one (11.532)

2.5 g. of 1-(5-nitrofuryl-2-acrylidene)amino-imidazolidin-2-one, 20 ml. of anhydrous dimethylformamide and 2.5 ml. of chloroacetyl isocyanate are stirred at room temperature for 2 hours, using a magnetic stirrer (heating is observed to occur after the reactants have been mixed). Reaction is brought about by heating the mixture for 30 minutes at 100° C. The reaction mixture is kept overnight at 0° C. and the solid is then filtered off, washed with diethyl ether and recrystallised from dimethylformamide.

2.1 g. of an orange yellow, well crystallised product which melts at 260–261° C. with decomposition are thus obtained.

EXAMPLE 32

1-(5-nitrofuryl-2-acrylidene)amino-3-(N-chloroacetylcarbamoyl)-4-methylimidazolidin-2-one (11.531)

2 g. of 1-(5-nitrofuryl-2-acrylidene)amino-4-methylimidazolidin-2-one, 15 ml. of anhydrous dimethylformamide and 1.5 ml. of chloroacetyl isocyanate are heated for 2 hours at 80 to 90° C. with stirring using a magnetic stirrer. The reaction mixture is kept overnight at room temperature and 25 to 30 g. of crushed ice are then introduced. A bright yellow precipitate rapidly forms. After it has been left to stand for 2 hours, the precipitate is filtered off, washed with water, alcohol and diethyl ether and then dried at 80° C. under reduced pressure. 1.8 g. of a yellow solid which melts at 194–195° C. with decomposition is thus obtained.

EXAMPLE 33

1-(5-nitrofuryl-2-acrylidene)amino-3-(N-chloroacetylcarbamoyl-3,4,5,6-tetrahydropyrimidin-2-one (11.552)

The procedure described in Example 32 is followed but the 1-(5-nitrofuryl-2-acrylidene)amino - 4 - methylimidazolidin-2-one is replaced by 1-(5-nitrofuryl-2-acrylidene)-amino-3,4,5,6-tetrahydropyrimidine-2-one (2 g.): 1.8 g. of yellow solid which decomposes on heating from 120° upwards is obtained.

EXAMPLE 34

1-(5-nitrofuryl-2-acrylidene)amino-3-(N-dichloroacetylcarbamoyl)-imidazolidin-2-one (11.739)

A suspension of 1.5 g. of 1(5-nitrofuryl-2-acrylidene)-amino-imidazolidin-2-one in 15 ml. of anhydrous benzene containing 3 ml. of dichloroacetyl isocyanate is heated to boiling under reflux for 4 hours with stirring, using a magnetic stirrer. The reaction mixture is kept overnight at room temperature and the solid which separates is then filtered off, washed with benzene and recrystallized from dimethylformamide. The crystallised product is filtered off and washed with diethylether and then dried at 80° C. under reduced pressure. 1.8 g. of a well crystallised solid in the form of bright yellow platelets which melt at 260–261° C. with decomposition is thus obtained.

EXAMPLE 35

1-(5-nitrofuryl-2-acrylidene)amino-3-(N-dichloroacetyl-
carbamoyl)-4-methylimidazolidin-2-one (11.740)

The procedure described in Example 34 is followed but the 1-(5-nitrofuryl-2-acrylidene)aminoimidazolidin-2-one is replaced by 1-(5-nitrofuryl-2-acrylidene)amino-4-methylimidazolidin-2-one (1.5 g.): 1.9 g. of a yellow solid which melts at 220 to 221° C. with decomposition is obtained after recrystallisation from dimethylformamide.

EXAMPLE 36

1-(5-nitrofuryl - 2 - acrylidene)amino - 3 - (N-dichloro-
acetylcarbamoyl) - 3,4,5,6 - tetrahydropyrimidine - 2-
one (11.741)

The 1-aminoimidazolidin-2-one derivative used in Example 34 is replaced by 1-(5-nitrofuryl-2-acrylidene)amino-3,4,5,6-tetrahydropyrimidin-2-one (1.5 g.), the procedure of Example 34 otherwise remaining unchanged: 1.6 g. of a bright yellow solid which melts at 224 to 225° C. with decomposition is obtained after recrystallisation from dimethylformamide.

EXAMPLE 37

1-(5-nitrofuryl-2-acrylidene)amino-3-(N-trichloroacetyl-
carbamoylimidazolidin-2-one (11.643)

2.5 g. of 1-(5-nitrofuryl-2-acrylidene)amino-imidazolidin-2-one in suspension in 15 ml. of anhydrous benzene containing 3 ml. of trichloroacetyl isocyanate are heated to boiling under reflux for 3 hours. The reaction medium is left to stand overnight at room temperature and is then filtered off and washed in a little benzene. The solid is recrystallised from the minimum quantity of dimethylformamide at 100° C. by cooling the resulting hot solution to 0° C. A well crystallised solid is obtained. This is filtered off, washed with alcohol and diethyl ether and then dried at 80° C. under reduced pressure. 3.1 g. of an orange yellow solid which melts at 247 to 248° C. with decomposition are thus obtained.

EXAMPLE 38

1 - (5 - nitrofuryl - 2-acrylidene)amino-3-(N-trichloro-
acetylcarbamoyl) - 4 - methylimidazolidin - 2 - one
(11.682)

1.5 g. of 1-(5-nitrofuryl-2-acrylidene)amino-4-methylimidazolidin-2-one, 12 ml. of anhydrous dimethylformamide and 1.2 g. of trichloroacetyl isocyanate are heated with stirring by means of a magnetic stirrer at 120° C. for 0.5 hour. All the reactants dissolve under these conditions. By cooling the reaction mixture to 0° C. overnight a well crystallised orange yellow solid is deposited. It is filtered off and washed with alcohol, then with diethyl ether and finally dried at 80° C. under reduced pressure. 2.1 g. of a solid which melts at 153 to 155° C. are thus obtained.

EXAMPLE 39

1 - (5 - nitrofuryl - 2-acrylidene)amino-3-(N-trichloro-
acetyl carbamoyl) - 3,4,5,6 - tetrahydropyrimidine-2-
one (11.683)

By replacing the 1-(5-nitrofuryl-2-acrylidene)amino-4-methylimidazolidin-2-one used in Example 38 by 1-(5-nitrofuryl - 2 - acrylidene)amino - 3,4,5,6-tetrahydropyrimidine-2-one (1.5 g.), the remaining procedure being unchanged, 1.31 g. of a well crystallised orange yellow solid which melts at 202 to 203° C. with decomposition is obtained.

EXAMPLE 40

1-(5-nitrofuryl-2-acrylidene)amino-3-(N-para-chloro-
benzoylcarbamoyl)imidazolidin-2-one (11.642)

1 g. of 1-(5-nitrofuryl-2-acrylidene)aminoimidazolidin-2-one, 8 ml. of anhydrous dimethylformamide and 1 g. of parachlorobenzoyl isocyanate are held at room temperature for one hour with stirring and are then heated for one hour at 100° C. The reaction mixture is left to stand overnight at room temperature. The resulting canary yellow solid which crystallises as well formed platelets if filtered off, taken up in boiling alcohol (10 minutes) and then again filtered off, washed with diethyl ether and dried under reduced pressure at 80° C.

1.5 g. of a product which decomposes upon heating from 250° C. upwards is obtained.

EXAMPLE 41

1-(5-nitrofuryl-2-acrylidene)amino-3-(N-2,4-dichloro-
benzoylcarbamoyl)imidazolidin-2-one (11.665)

1.1 g. of 1-(5-nitrofuryl-2-acrylidene)amino-imidazolidin-2-one, 8 ml. of anhydrous dimethylformamide and 1 g. of 2,4-dichlorobenzoyl isocyanate are heated at 100° C. for one hour. Complete solution occurs after heating for 0.75 hour. The reaction mixture is then cooled to −10° C., 30 ml. of anhydrous diethyl ether are added and the reaction mixture is left to stand overnight. The solid which separates is filtered off and taken up twice in 15 ml. of boiling alcohol. Under these conditions, a bright yellow pulverulent solid is obtained which is filtered off, washed with diethyl ether and dried at 80° C. under reduced pressure. 1.2 g. of a product which melts at 185 to 186° C. with decomposition is obtained.

EXAMPLE 42

1 - (5 - nitrofuryl-2-acrylidene)amino-3-(N-2,4-dichloro-
benzoylcarbamoyl) - 4 - methylimidazolidin - 2 - one
(11.681)

1.5 g. of 1-(5-nitrofuryl-2-acrylidene)amino-4-methyl-imidazolidin-2-one, 9 ml. of anhydrous dimethylformamide and 1 g. of 2,4-dichlorobenzoyl isocyanate are heated for 30 minutes at 100° C. A homogeneous solution is obtained. The reaction mixture is evaporated to dryness under reduced pressure in a rotary evaporator at 100° C. The residue is taken up twice in 20 ml. of boiling alcohol and then dissolved in the minimum of dimethylformamide. A solid crystallises upon gradual addition of water. After having been left to stand overnight, the solid is filtered off, washed with a little alcohol, then with diethyl ether and finally dried at 50° C. under reduced pressure. 0.9 g. of a light yellow product which melts as 128 to 130° C. is thus obtained.

EXAMPLE 43

1-(5-nitrofuryl-2-acrylidene)amino-3-(N-3,4-dichloro-
benzoylcarbamoyl)imidazolidin-2-one (11.736)

1.5 g. of 1-(5-nitrofuryl-2-acrylidene)amino-imidazolidin-2-one, 15 ml. of dimethylformamide and 1.5 g. of 3,4-dichlorobenzoyl isocyanate are heated for one hour at 100° C. The reaction mixture is then heated for 5 minutes at 120° C. to obtain complete solution and then left to stand overnight at room temperature. A bright yellow well crystallised solid is deposited. It is filtered off, taken up in boiling alcohol, again filtered off and then washed with diethyl ether and dried at 80° C. under reduced pressure. 1.94 g. of a product which melts at 208 to 210° C. with decomposition is obtained.

EXAMPLE 44

1 - (5 - nitrofuryl - 2 - acrylidene)amino-3-(N-3,4-di-
chlorobenzoylcarbamoyl) - 4 - methylimidazolidin-2-
one (11.737)

1.5 g. of 1-(5-nitrofuryl-2-acrylidene)amino-4-methyl-imidazolidin-2-one, 10 ml. of redistilled dimethylformamide and 1.5 g. of 3,4-dichlorobenzoyl isocyanate are heated for 2 hours at 100° C. and the reaction mixture is then left to stand overnight at room temperature. The solid which crystallises is filtered off, washed with hot alcohol and with diethyl ether and then dried at 80° C. under reduced pressure. 1.2 g. of a solid which melts at 267 to 268° C. with decomposition is thereby obtained. A second crop is obtained by adding diethyl ether to the dimethylformamide solution separated by filtration; 0.8 g. of crystals are collected after washing with alcohol and with diethyl ether and then drying.

EXAMPLE 45

1-(5-nitrofuryl-2-acrylidene)amino-3-(N-3,4-dichlorobenzoylcarbamoyl) - 3,4,5,6-tetrahydropyrimidin- 2 - one (11.738)

1.5 g. of 1-(5-nitrofuryl-2-acrylidene)amino-3,4,5,6-tetrahydropyrimidin-2-one, 10 ml. of anhydrous dimethylformamide and 1.5 g. of 3,4-dichlorobenzoyl isocyanate are heated for one hour at 100° C. and then left for 2 hours at 0° C. 15 ml. of anhydrous diethyl ether are added to the reaction mixture and the whole kept overnight at 0° C. The solid obtained is filtered oc, washed with alcohol and diethyl ether and then dried at 80° C. under reduced pressure. 0.9 g. of a bright yellow solid which melts with decomposition at 205 to 206° C. is obtained.

The compounds prepared as described in the above examples have been subjected to pharamacological tests the main results of which will now be set forth.

(a) Antimicrobial activity

The technique employed is the determination of the minimum inhibitory concentration in micrograms per millilitre, the threshold value of bacterial growth inhibition being found by serial dilutions in agar medium.

Starting from a mother solution having a concentration of 500 µg./ml., an intermediate series of the product to be tested, ranging in concentration from 500 to 0.5 µg./ml., is prepared by dilution with sterile distilled water. 2 ml. of the intermediate dilution are added to 18 ml. of molten agar heated to 50° C. The constituents are well mixed and the whole mixture is then poured into a 10 cm. Petri dish. A final agar concentration of between 50 and 0.05 µg./ml. is obtained in this way. The dry surface is then inoculated with 18 hour cultures of different bacteria.

Readings are taken after 18 and 24 hours of incubation at 37° C.

The antibacterial spectrum studied in vitro yielded the results given in Tables I and Ib.

(b) Action against Koch bacillus in vitro (Table II)

The liquid medium used for the assays was Youmans' serum distributed in 22 mm. tubes in portions of 5 ml. per tube. The substance to be assayed is distributed in the tubes, the concentrations ranging from 10 µg. to 0.05 µg./ml. The tubes are inoculated with a strain of *Mycobacterium tuberculosis* H 37 Rv taken from a 7 to 9 days culture on Dubos medium, two inoculations being carried out (0.01 mg. of bacilli and 0.1 mg. for 5 ml. of test medium).

The culture is tested by nephelometry, comparing the culture in Dubos medium with that of a scale comprising a series of BCG suspensions.

Readings are taken on the 6th, 12th and 18th day. The bacteriostatic concentration is taken to be that concentration which prevents the appearance of a culture visible to the naked eye on the 6th day after inoculation of 0.01 mg.

The reading taken on the 18th day, especially with the 0.1 mg. inoculation, gives an approximate measure of the number of resistant bacilli present in a normal strain. The results are summarised in Table II.

(c) Action on *Treponema pallidum*, Reiter strain

The in vitro study of the antitreponemal activity of 11 380 CB was carried out on a treponema culture of the Reiter strain, the culture medium used being Brewer's medium. The mobility compared with that of control cultures is measured at various times. The results obtained are summarised in Table III.

(d) Experimental diseases in mice

The compounds were assayed especially on the following experimental diseases:

Streptococcal (*Streptococcus pyogenes* 561 IP at a dilution of $10^{-7}$),
Staphylococcal (*Staphylococcus pyogenes* var. *aureus* D. 319 at a dilution of $5 \times 10^{-2}$),
Salmonellosis (*Salmonella typhi-murium* 222 IP at a dilution of $5 \times 10^{-2}$),
Listeriosis (*Listeria monocytogenes* 5734 IP at $1 \times 10^{-1}$),
Pasteurellosis (*Pasteurella septica* 5621 IP at $10^{-6}$),
Erysipelas (*Erysipelothrix insidiosa* $A_{27}$ at $10^{-3}$),
Klebsiellosis (*Klebsiella pneumoniae* 52145 at $10^{-4}$).

Each mouse is given intraperitoneally 0.5 ml. of a dilution of the 24 hour culture. The dose administered corresponds to 10 times the $LD_{50}$ value.

The products to be studied are administered orally by oesophagial tube 1, 7, 24, 32, 48 and 56 hours after infection at the dosages indicated in Table IV where the results are given in percentages of survival after 12 days.

(e) Experimental syphilis in the rabbit

The rabbit is inoculated by the intratesticular route with the Nichols strain of *Treponema pallidum*; the treatment begins 24 hours later, the animals being treated orally with the products to be studied and at the doses prescribed (Table V).

(f) Serial concentrations

The animals used are rats weighing about 100 g. to which the different compounds are administered orally in doses of 100, 150 or 200 mg./kg. in a single dose.

Dogs were also used as experimental animals. The different compounds were administered orally in doses of 100 or 150 mg./kg. Samples of blood were taken from the rats or dogs 15 minutes, 30 minutes, one hour, 1.5 hours, 2 hours, 3 hours and 4 hours after administration of the products.

The serial concentrations of the different products were determined by biological methods. The method used was horizontal diffusion in agar with the strain *Bacillus subtilis* ATCC 6633 at ¹⁄₄₀₀ as test bacterium.

The results are shown in Tables VI and VIb.

(g) Urinary concentrations

The animals used are rats weighing about 150 g. which receive the different compounds orally at a dose of 100 mg./kg. in a single dose.

The urine is collected in graduated test tubes. The concentrations of the different products in the urine are determined by the method of horizontal diffusion in agar with the strain *Bacillus subtilis* ATCC 6633 at ¹⁄₄₀₀ at test bacterium.

The results are given in Table VII.

(h) Toxicological study of 11 380 CB (A) Acute toxicity.—The acute toxicity of 11 380 was studied in mice after oral or intraperitoneal administration.

The following results were obtained after 72 hours observation:

| Route: | Doses in mg./kg. maximum dose tolerated |
|---|---|
| Intraperitoneal | >2000 |
| Oral | >3000 |

(B) Fractional toxicity.—Large doses of 11 380 CB were administered orally each day to batches of 10 mice. Administration of the product was repeated on 4 successive days. The daily doses administered were 250 mg. and 500 mg. per kilogram bodyweight.

Results obtained

Mortality:

The following table represents the mortality observed during the course of the experiment:

| Dose in mg./kg. | Mortality observed after doses— | | | | Total mortality percent |
|---|---|---|---|---|---|
| | 1 | 2 | 3 | 4 | |
| 250 | 0 | 0 | 0 | 0 | 0 |
| 500 | 0 | 0 | 0 | 0 | 0 |

Weight changes in the animals:

11 380 CB when administered in a dose of 250 mg./kg. produces no weight change. When the daily dose is 500 mg./kg., there is no gain in weight but a slight falling off is observed after the fourth dose.

Chronic toxicity in the rat:

The chronic toxicity of 11 380 CB was studied in Wistar rats for a period of 3 months, at doses of 500 mg./kg. of animal per day, administration being by the oral route.

No mortality was observed and growth as well as the blood picture were satisfactory. The biological constants were not modified. Examination of the organs did not reveal any microscopic or macroscopic lesions.

Among the products studied the compounds 11 380 CB, 11 295 CB and 10 939 CB were found to be particularly interesting as antibacterial products for systemic use. In particular the compound 11 380 CB may be used in human and veterinary medicine by local or general administration in infectious conditions in which the bacteria responsible are susceptible to the action of one of the products, such as infectious conditions due to staphylococci, streptococci, and salmonellosis.

The weight of active substance administered may vary within the range of 500 mg. to 3 g. per day and tablets and ointment may be employed, the examples given being purely by way of illustration:

Tablets

For one tablet: Mg.
- 1 - (5 - nitrofuryl - 2 - acrylidene)amino-3-(N-methylcarbamoyl)imidazolidin - 2 - one (11 380 CB) _____ 250
- Lactose _____ 30
- Starch _____ 30
- Magnesium stearate _____ 6
- Talcum _____ 6

Ointment
G.
- 1-(5-Nitrofuryl - 2 - acrylidene)amino-3-(N-methylcarbamoyl)imidazolidin-2-one (11 380 CB) _____ 2
- Lanoline _____ 5
- Vaseline, q.s. for 100 g.

The products of the invention, in particular 11 380 CB, may be used as additives to animal foodstuffs, optionally in infra-therapeutic doses, either for improving the growth of the animals and the extent of utilisation of the foodstuffs or to prevent certain infectious conditions such as salmonellosis. The concentrations used in these foodstuffs may be of the order of 2 parts per 100,000 parts to 2 percent.

TABLE I.—ANTIBACTERIAL ACTION IN VITRO
[Minimum inhibitory concentration expressed in µg./ml.]

| Gram + | 10 939 | 11 380 | 11 295 | 11 393 | 11 394 | 11 438 | 11 439 | 11 440 | 11 500 | 11 435 | 11 313 | 11 327 | 11 501 |
|---|---|---|---|---|---|---|---|---|---|---|---|---|---|
| Staphylococcus londres | 0.4 | 0.4 | 0.8 | 0.8 | 0.4 | 0.8 | 0.8 | 0.8 | 3.12 | 1.56 | 1.56 | 0.8 | 6.25 |
| Staphylococcus aureus 521 IP | 3.12 | 0.8 | 0.8 | 0.8 | 0.4 | 1.56 | 1.56 | 1.56 | 3.12 | 1.56 | 50 | 3.12 | 12.5 |
| Streptococcus pyogenes gr. A 561 IP | 25 | 0.8 | 6.25 | 1.56 | 0.8 | 1.56 | 1.56 | 3.12 | 6.25 | 3.12 | 50 | 12.5 | 25 |
| Streptococcus agalactiae gr. B 55 118 IP | 25 | 0.8 | 3.12 | 1.56 | 0.8 | 1.56 | 1.56 | 3.12 | 6.25 | 3.12 | 50 | 12.5 | 25 |
| Streptococcus faecalis gr. D A 23 | 3.12 | 3.12 | 6.25 | 6.25 | 3.12 | 6.25 | 6.25 | 12.5 | 12.5 | 12.5 | 50 | 12.5 | >50 |
| Sarcina lutea ATCC 9 341 | 50 | 12.5 | 25 | 50 | 25 | 50 | >50 | >50 | 50 | >50 | >50 | 12.5 | 50 |
| Bacillus cereus ATCC 9 634 | 3.12 | 0.1 | 0.4 | 0.2 | 0.05 | 0.1 | 0.2 | 0.4 | 0.8 | 0.4 | 0.8 | 1.56 | 0.4 |
| Bacillus subtilis ATCC 6 633 | 0.4 | 0.4 | ≤0.05 | 0.2 | 0.1 | ≤0.05 | 0.1 | 0.2 | 0.8 | 0.2 | 0.8 | 0.2 | 0.8 |
| Listeria monocytogenes 5 734 | 6.25 | 1.56 | 3.12 | 3.12 | 1.56 | 3.12 | 3.12 | 3.12 | 12.5 | 6.25 | 50 | 3.12 | >50 |
| Corynebacterium abbott | 50 | >50 | >50 | 50 | 50 | >50 | >50 | 50 | 50 | >50 | >50 | 50 | >50 |

| Gram + | 11 546 | 11 547 | 11 548 | 11 532 | 11 551 | 11 553 | 11 601 | 11 642 | 11 665 | 11 663 | 11 664 | 11 643 | 11 682 |
|---|---|---|---|---|---|---|---|---|---|---|---|---|---|
| Staphylococcus londres | 50 | 50 | 3.12 | 0.8 | 0.8 | 0.4 | 0.8 | 0.4 | 0.8 | 0.4 | 0.8 | 0.4 | 0.8 |
| Staphylococcus aureus 521 IP | 50 | 50 | 3.12 | 0.8 | 0.8 | 0.8 | 0.8 | 0.8 | 0.8 | 0.8 | 0.8 | 1.56 | 0.8 |
| Streptococcus pyogenes gr. A 561 IP | >50 | 50 | 12.5 | 0.4 | 0.8 | 0.2 | 0.8 | 0.8 | 1.56 | 0.8 | 0.8 | 0.8 | 0.8 |
| Streptococcus agalactiae gr. B 55 118 IP | >50 | 50 | 12.5 | 0.4 | 0.8 | 0.4 | 0.8 | 0.8 | 25 | 3.12 | 0.8 | 0.8 | 0.8 |
| Streptococcus faecalis gr. D A 23 | >50 | 50 | 12.5 | 1.56 | 3.12 | 1.56 | 3.12 | 25 | 3.12 | 1.56 | 3.12 | 3.12 | 1.56 |
| Sarcina lutea ATCC 9 341 | >50 | >50 | 50 | 50 | 50 | 25 | 25 | >50 | 50 | 12.5 | 25 | 25 | 50 |
| Bacillus cereus ATCC 9 634 | 50 | 50 | 0.8 | 0.4 | 0.2 | 0.2 | 0.2 | 0.2 | 0.4 | 0.4 | 0.4 | 0.4 | 0.2 |
| Bacillus subtilis ATCC 6 633 | 50 | 1.56 | 0.4 | 0.2 | 0.4 | 0.4 | 0.2 | 0.2 | 0.4 | 0.1 | ≤0.05 | 0.2 | 0.1 |
| Listeria monocytogenes 5 734 | 50 | 50 | 12.5 | 1.56 | 3.12 | 1.56 | 1.56 | 25 | 3.12 | 1.56 | 3.12 | 3.12 | 1.56 |
| Corynebacterium abbott | 50 | 50 | 50 | 50 | 50 | >50 | >50 | >50 | >50 | >50 | 50 | >50 | >50 |

TABLE I.—ANTIBACTERIAL ACTION IN VITRO—Continued

| Gram+ | 11 681 | 11 242 | 11 425 | 11 430 | 11 431 | 11 432 | 11 433 | 11 434 | 11 436 | 11 552 | 11 600 | 11 683 | 11 680 |
|---|---|---|---|---|---|---|---|---|---|---|---|---|---|
| Staphylococcus londres | 0.8 | 0.8 | 0.8 | 1.56 | 1.56 | 3.12 | 3.12 | 12.5 | 0.4 | 0.4 | 0.8 | 0.8 | 1.56 |
| Staphylococcus aureus 521 IP | 0.8 | 3.12 | 1.56 | 3.12 | 6.25 | 12.5 | 6.25 | 25 | 1.56 | 1.56 | 1.56 | 1.56 | 1.56 |
| Streptococcus pyogenes gr. A 561 IP | 1.56 | 25 | 1.56 | 6.25 | 12.5 | 50 | 12.5 | >50 | 50 | 0.8 | 0.8 | 1.56 | 1.56 |
| Streptococcus agalactiae gr. B 55 118 IP | 1.56 | 12.5 | 1.56 | 6.25 | 12.5 | 50 | 12.5 | >50 | 50 | 3.12 | 0.8 | 1.56 | 3.12 |
| Streptococcus faecalis gr. D A 23 | 3.12 | 12.5 | 2.50 | 25 | 50 | 50 | 25 | >50 | 50 | 6.25 | 0.8 | 1.56 | 6.25 |
| Sarcina lutea ATCC 9 341 | >50 | 50 | 50 | 50 | 50 | >50 | >50 | >50 | 12.5 | 12.5 | 25 | 50 | 50 |
| Bacillus cereus ATCC 9 634 | 0.2 | 0.8 | 0.4 | 0.4 | 0.8 | 1.56 | 0.8 | 3.12 | 0.8 | 0.1 | 0.4 | 0.4 | 0.4 |
| Bacillus subtilis ATCC 6 633 | 0.2 | 0.4 | 0.4 | 0.4 | 0.8 | 1.56 | 0.8 | 3.12 | 0.4 | 0.1 | 0.2 | 0.2 | 0.2 |
| Listeria monocytogenes 5 734 | 3.12 | 6.25 | 6.25 | 12.5 | 12.5 | 25 | 12.5 | >50 | 12.5 | 3.12 | 3.12 | 3.12 | 6.25 |
| Corynebacterium abbott | >50 | 50 | >50 | 50 | >50 | >50 | >50 | >50 | >50 | 50 | >50 | >50 | >50 |

| Gram— | 10 939 | 11 380 | 11 295 | 11 393 | 11 394 | 11 438 | 11 439 | 11 440 | 11 500 | 11 435 | 11 313 | 11 327 | 11 501 |
|---|---|---|---|---|---|---|---|---|---|---|---|---|---|
| Past. pseudo tuberculosis C 114 | 1.56 | 0.8 | 3.12 | 6.25 | 3.12 | 6.25 | 12.5 | 25 | 50 | 25 | 50 | 1.56 | >50 |
| Esch. coli A 223 IP | 1.56 | 0.8 | 1.56 | 3.12 | 1.56 | 3.12 | 12.5 | 25 | 12.5 | 25 | 50 | 1.56 | 50 |
| Esch. coli F 260 | 0.4 | 0.8 | 3.12 | 12.5 | 6.25 | 12.5 | 6.25 | 50 | 25 | 25 | 50 | 1.56 | >50 |
| Esch. coli moned D 198 | 0.8 | 0.8 | 1.56 | 3.12 | 1.56 | 6.25 | 12.5 | 50 | 12.5 | 25 | 50 | 1.56 | >50 |
| Klebsiella pneumoniae ATCC 10 031 | 1.56 | 0.8 | 1.56 | 3.12 | 3.12 | 1.56 | 6.25 | 12.5 | 6.25 | 6.25 | 50 | 1.56 | 50 |
| Klebsiella mistral E 156 | 3.12 | 3.12 | 12.5 | 25 | 12.5 | 50 | 50 | 50 | 50 | 50 | 50 | 6.25 | 50 |
| Salmonella typhimurium A 222 IP | 3.12 | 1.56 | 3.12 | 6.25 | 3.12 | 50 | 50 | 50 | 50 | 50 | >50 | 1.56 | 50 |
| Salmonella para B E 118 | 0.8 | 1.56 | 3.12 | 12.5 | 3.12 | 25 | 50 | 50 | 50 | 50 | 50 | 1.56 | >50 |
| Shigella dysenteriae 5 728 IP | 1.56 | 0.8 | 3.12 | 6.25 | 1.56 | 6.25 | 12.5 | 25 | 12.5 | 25 | 50 | 6.25 | 25 |
| Pseudomonas aeruginosa A 22 IP | 50 | >50 | >50 | >50 | >50 | >50 | >50 | >50 | >50 | >50 | >50 | 50 | >50 |
| Past. Septica type C, 5 621 | 3.12 | 3.12 | 0.2 | 6.25 | 3.12 | 3.12 | 6.25 | 12.5 | 12.5 | 6.25 | 1.56 | 12.5 | 25 |

TABLE I.—Continued

| Gram − | 11 546 | 11 547 | 11 548 | 11 532 | 11 551 | 11 553 | 11 601 | 11 642 | 11 665 | 11 663 | 11 664 | 11 643 | 11 682 |
|---|---|---|---|---|---|---|---|---|---|---|---|---|---|
| Past. pseudo tuberculosis C114 | 50 | 50 | 6.25 | 1.56 | 3.12 | 0.8 | 12.5 | 50 | 12.5 | 1.56 | 6.25 | 1.56 | 3.12 |
| Esch. Coli A 223 IP | >50 | 50 | 6.25 | 0.8 | 1.56 | 0.2 | 1.56 | 6.25 | 3.12 | 0.8 | 3.12 | 0.8 | 3.12 |
| Esch. coli F 260 | >50 | 50 | 3.12 | 1.56 | 3.12 | 0.4 | 1.56 | 12.5 | 3.12 | 1.56 | 6.25 | 0.8 | 3.12 |
| Esch. coli monod D 198 | >50 | 50 | 3.12 | 0.8 | 3.12 | 0.4 | 1.56 | 12.5 | 12.5 | 1.56 | 6.25 | 0.8 | 3.12 |
| Klebsiella pneumoniae ATCC 10 031 | >50 | >50 | 3.12 | 0.8 | 0.8 | 0.2 | 1.56 | 12.5 | 3.12 | 0.8 | 3.12 | 0.8 | 1.56 |
| Klebsiella mistral E 156 | >50 | >50 | 25 | 6.25 | 25 | 3.12 | 25 | >50 | 50 | 12.5 | 50 | 3.12 | 6.25 |
| Salmonella typhimurium A 222 IP | >50 | >50 | 3.12 | 1.56 | 3.12 | 0.4 | 6.25 | 12.5 | 6.25 | 1.56 | 12.5 | 0.8 | 50 |
| Salmonella para B E 118 | >50 | 50 | 3.12 | 50 | 3.12 | 3.12 | 12.5 | 12.5 | 6.25 | 1.56 | 12.5 | 0.8 | 6.25 |
| Shigella dysenteriae 5 728 IP | >50 | 50 | 25 | 0.8 | 3.12 | 0.4 | 3.12 | 12.5 | 6.25 | 1.56 | 6.25 | 0.8 | 3.12 |
| Pseudomonas aeruginosa A 22 IP | >50 | >50 | 50 | >50 | >50 | >50 | 50 | >50 | >50 | >50 | >50 | >50 | >50 |
| Past. septica type C, 5 621 | 50 | 50 | 3.12 | 1.56 | 1.56 | 0.8 | 6.25 | 50 | 25 | 1.56 | 3.12 | 3.12 | 3.12 |

| Gram − | 11 681 | 11 242 | 11 425 | 11 430 | 11 431 | 11 432 | 11 433 | 11 434 | 11 436 | 11 552 | 11 600 | 11 683 | 11 680 |
|---|---|---|---|---|---|---|---|---|---|---|---|---|---|
| Past. pseudo tuberculosis C 114 | 12.5 | 12.5 | 3.12 | 6.25 | 12.5 | 25 | 12.5 | 50 | 3.12 | 25 | 3.12 | 1.56 | 6.25 |
| Esch. coli A 223 IP | 6.25 | 0.8 | 1.56 | 6.25 | 12.5 | 12.5 | 6.25 | 50 | 12.5 | 3.12 | 0.8 | 0.8 | 3.12 |
| Esch. coli F 260 | 12.5 | 0.8 | 3.12 | 6.25 | 12.5 | 25 | 12.5 | >50 | 12.5 | 12.5 | 0.8 | 1.56 | 6.25 |
| Esch. coli monod D 198 | 12.5 | 0.8 | 3.12 | 6.25 | 12.5 | 25 | 12.5 | >50 | 12.5 | 3.12 | 0.8 | 0.8 | 1.56 |
| Klebsiella pneumoniae ATCC 10 031 | 6.25 | 0.8 | 0.4 | 3.12 | 1.56 | 6.25 | 3.12 | 25 | 1.56 | 0.8 | 0.4 | 0.8 | 1.56 |
| Klebsiella mistral E 156 | >50 | 12.5 | 25 | 50 | 50 | 50 | 50 | >50 | 50 | 50 | 6.25 | 3.12 | 50 |
| Salmonella typhimurium A 222 IP | >50 | 1.56 | 6.25 | 25 | 50 | 50 | 50 | >50 | 25 | 12.5 | 1.56 | 12.5 | 12.5 |
| Salmonella para B E 118 | 50 | 0.8 | 3.12 | 25 | 50 | 50 | 50 | >50 | 25 | 12.5 | 1.56 | 1.56 | 12.5 |
| Shigella dysenteriae 5 728 IP | >50 | 1.56 | 6.25 | 6.25 | 25 | 25 | 25 | 50 | 25 | 12.5 | 0.8 | 0.8 | 6.25 |
| Pseudomonas aeruginosa A 22 IP | >50 | >50 | 50 | 50 | 50 | >50 | >50 | >50 | >50 | >50 | >50 | >50 | >50 |
| Past. septica type C, 5 621 | 12.5 | 0.4 | 3.12 | 6.25 | 6.25 | 12.5 | 6.25 | 25 | 12.5 | 3.12 | 3.12 | 1.56 | 6.25 |

TABLE Ib.—ANTIBACTERIAL ACTION IN VITRO
[Minimum inhibitory concentration expressed in μg./ml.]

| Germes gram + | 10 939 | 11 380 | 11 295 | 11 393 | 11 394 | 11 548 | 11 532 | 11 553 | 11 601 | 11 663 | 11 643 | 11 552 | 11 600 |
|---|---|---|---|---|---|---|---|---|---|---|---|---|---|
| Staphylococcus londres | 0.4 | 0.2 | 0.4 | 0.4 | 0.4 | 1.56 | 0.4 | 0.2 | 0.4 | 0.4 | 0.4 | 0.4 | 0.4 |
| Staphylococcus 209 IP | 3.12 | 1.56 | 1.56 | 1.56 | 1.56 | 1.56 | 0.8 | 0.4 | 1.56 | 0.8 | 1.56 | 0.8 | 3.12 |
| Stapholococcus aureus Gervais D 319 | 1.56 | 0.8 | 1.56 | 1.56 | 0.8 | 6.25 | 0.4 | 0.8 | 1.56 | 0.4 | 0.8 | 1.56 | 1.56 |
| Staphylococcus aureus E 120 | 0.8 | 0.8 | 1.56 | 0.8 | 0.8 | 1.56 | 1.56 | 0.4 | 1.56 | 0.4 | 1.56 | 1.56 | 1.56 |
| Staphylococcus albus PCI 1 200 | 0.4 | 0.2 | 0.4 | 0.4 | 0.2 | 3.12 | 0.4 | 0.2 | 0.4 | 0.4 | 0.4 | 0.4 | 0.4 |
| Streptococcus pyogenes gr. A 561 IP | 25 | 0.8 | 3.12 | 1.56 | 0.8 | 25 | 0.8 | 0.2 | 0.4 | 0.8 | 1.56 | 0.8 | 0.4 |
| Streptococcus pyogenes gr. AD 313 | 1.56 | 0.8 | 1.56 | 0.8 | 0.4 | 6.25 | 3.12 | 0.4 | 0.8 | 0.4 | 0.8 | 1.56 | 1.56 |
| Streptococcus agalactiae gr. B | 25 | 0.8 | 1.56 | 1.56 | 0.8 | 25 | 0.4 | 0.4 | 0.4 | 0.4 | 0.4 | 1.56 | 0.8 |
| Streptococcus pyogenes gr .C | 1.56 | 0.4 | 3.12 | 1.56 | 0.8 | 6.25 | 0.8 | 0.4 | 0.8 | 0.4 | 0.4 | 1.56 | 1.56 |
| Streptococcus faecalis var. zymogenes | 3.12 | 1.56 | 3.12 | 3.12 | 3.12 | 25 | 6.25 | 0.8 | 1.56 | 3.12 | 3.12 | 3.12 | 1.56 |
| Streptococcus faecalis gr. D 5 434 IP | 25 | 0.8 | 1.56 | 1.56 | 0.8 | 25 | 0.8 | 0.2 | 0.4 | 0.4 | 0.4 | 0.8 | 0.8 |
| Streptococcus faecalis gr. D F 262 | 3.12 | 0.8 | 1.56 | 1.56 | 1.56 | 6.25 | 0.8 | 0.4 | 1.56 | 0.8 | 0.8 | 1.56 | 3.12 |
| Sarcina lutea ATCC 9341 | 50 | 12.5 | 12.5 | 50 | 25 | >50 | 50 | 25 | 50 | 6.25 | 25 | 50 | 50 |
| Listeria monocy ogenes 5 844 IP | 6.25 | 3.12 | 6.25 | 1.56 | 1.56 | 6.25 | 3.12 | 1.56 | 1.56 | 1.56 | 1.56 | 3.12 | 1.56 |
| Listeria monocytogenes Ramisse type IV | 6.25 | 3.12 | 1.56 | 1.56 | 1.56 | 6.25 | 3.12 | 1.56 | 1.56 | 3.12 | 3.12 | 3.12 | 1.56 |
| Listeria monocytogenes Joubert E 102 | 6.25 | 1.56 | 1.56 | 1.56 | 1.56 | 6.25 | 1.56 | 1.56 | 1.56 | 1.56 | 1.56 | 3.12 | 1.56 |
| Erysipelothrix insidiosa E 159 | 1.56 | 0.4 | 0.4 | 1.56 | 0.8 | 3.12 | 0.8 | 0.2 | 0.4 | 0.4 | 0.4 | 0.4 | 1.56 |
| Erysipelothrix insidiosa A 27 | 12.5 | 0.2 | 0.2 | 0.2 | 0.1 | 3.12 | 0.4 | 0.1 | 0.4 | 0.8 | 0.2 | 0.2 | 1.56 |
| Bacillus cereus ATCC 10 702 | 0.2 | ≤0.05 | 0.2 | 0.1 | 0.1 | 1.56 | 0.4 | 0.1 | 0.1 | 0.05 | 0.1 | 0.4 | 0.2 |
| Bacillus cereus ATCC 9 634 | 0.4 | 0.8 | 0.4 | 0.1 | 0.1 | 1.56 | 0.4 | 0.1 | 0.2 | 0.2 | 0.4 | 0.4 | 0.4 |
| Bacillus subtilis Leugar A 156 | 0.4 | 0.2 | 0.1 | 0.2 | 0.1 | 1.56 | 0.4 | 0.1 | 0.1 | 0.1 | 0.2 | 0.4 | 0.2 |
| Bacillus subtilis Searle | 0.4 | 0.1 | 0.1 | 0.2 | 0.1 | 0.8 | 0.4 | 0.2 | 0.1 | 0.05 | 0.2 | 0.4 | 0.2 |

| Germes gram − | 10 939 | 11 380 | 11 295 | 11 393 | 11 394 | 11 548 | 11 532 | 11 553 | 11 601 | 11 663 | 11 643 | 11 552 | 11 600 |
|---|---|---|---|---|---|---|---|---|---|---|---|---|---|
| Pasteurella septica type B 55 129 | 0.05 | 1.56 | 3.12 | 3.12 | 1.56 | 12.5 | 3.12 | 1.56 | 1.56 | 1.56 | 1.56 | 3.12 | 3.12 |
| Pasteurella septica type C 5 621 | 1.56 | 1.56 | 0.1 | 3.12 | 3.12 | 12.5 | 6.25 | 1.56 | 3.12 | 1.56 | 3.12 | 3.12 | 3.12 |
| Pasteurella pseudotuberculosis C 114 | 1.56 | 1.56 | 3.12 | 6.25 | 3.12 | 6.25 | 3.12 | 1.56 | 3.12 | 1.56 | 1.56 | 3.12 | 3.12 |
| Pasteurella Joubert E 99 | 1.56 | 1.56 | 12.5 | 25 | 12.5 | 12.5 | 6.25 | 1.56 | 6.25 | 3.12 | 3.12 | 6.25 | 3.12 |
| Escherichia coli A 223 IP | 0.4 | 0.8 | 3.12 | 6.25 | 3.12 | 3.12 | 0.4 | 0.4 | 1.56 | 0.8 | 0.2 | 0.4 | 0.8 |
| Escherichia coli Monod D 198 | 0.8 | 0.8 | 3.12 | 6.25 | 1.56 | 3.12 | 0.8 | 0.4 | 1.56 | 0.8 | 0.4 | 0.8 | 1.56 |
| Escherichia coli 111 B4 A | 0.4 | 0.8 | 3.12 | 3.12 | 1.56 | 3.12 | 0.8 | 0.4 | 3.12 | 1.56 | 0.4 | 0.8 | 1.56 |
| Escherichia coli 26 B6 A | 0.4 | 1.56 | 3.12 | 6.25 | 3.12 | 3.12 | 3.12 | 0.8 | 3.12 | 1.56 | 0.4 | 0.8 | 1.56 |
| Escherichia coli 55 B5 A | 0.4 | 1.56 | 3.12 | 3.12 | 3.12 | 3.12 | 1.56 | 0.4 | 3.12 | 1.56 | 0.8 | 0.8 | 1.56 |
| Escherichia coli ATCC 10 536 | 0.4 | 1.56 | 3.12 | 3.12 | 3.12 | 1.56 | 0.4 | 0.4 | 1.56 | 1.56 | 0.4 | 0.8 | 1.56 |
| Klebsiella pneumoniae E 155 | 3.12 | 3.12 | 6.25 | 50 | 25 | 12.5 | 3.12 | 0.8 | 25 | 3.12 | 1.56 | 3.12 | 3.12 |
| Aerobacter aerogenes E 115 | 0.4 | 0.8 | 3.12 | 3.12 | 1.56 | 3.12 | 0.4 | 0.4 | 3.12 | 1.56 | 0.4 | 0.8 | 1.56 |
| Citrobacter Vi ++ | 0.8 | 1.56 | 3.12 | 6.25 | 3.12 | 3.12 | 1.56 | 0.4 | 6.25 | 3.12 | 0.8 | 1.56 | 3.12 |
| Salmonella typhi O 901 | 0.8 | 1.56 | 3.12 | 6.25 | 3.12 | 3.12 | 1.56 | 0.4 | 3.12 | 3.12 | 0.8 | 0.8 | 1.56 |
| Salmonella para A A 220 IP | 0.8 | 3.12 | 12.5 | 25 | 12.5 | 3.12 | 3.12 | 0.8 | 3.12 | 3.12 | 1.56 | 3.12 | 3.12 |
| Salmonella para B A 214 IP | 0.8 | 1.56 | 3.12 | 25 | 6.25 | 12.5 | 1.56 | 0.4 | 6.25 | 1.56 | 0.8 | 1.56 | 1.56 |
| Salmonella pullorum gallinarum 465 | 0.8 | 1.56 | 3.12 | 6.25 | 3.12 | 6.25 | 0.8 | 1.56 | 3.12 | 1.56 | 0.8 | 0.4 | 1.56 |
| Shigella dysenteriae 5 728 IP | 0.8 | 1.56 | 1.56 | 6.25 | 3.12 | 25 | 0.8 | 0.4 | 3.12 | 1.56 | 1.56 | 3.12 | 1.56 |
| Shigella Sonnei D 374 | 1.56 | 0.8 | 1.56 | 3.12 | 1.56 | 12.5 | 0.8 | 0.4 | 1.56 | 0.8 | 0.4 | 3.12 | 0.8 |
| Moraxella lwoffi D | 25 | >50 | 50 | 50 | 50 | >50 | 50 | 50 | >50 | 50 | 50 | 50 | >50 |
| Pseudomonas aeruginosa B 74 | 50 | >50 | >50 | >50 | >50 | >50 | 50 | 50 | >50 | >50 | >50 | >50 | >50 |
| Bordetella bronchiseptica | 1.56 | 50 | 50 | 25 | 25 | 50 | 50 | 50 | >50 | 50 | 50 | 50 | 50 |

TABLE II.—ACTION IN VITRO ON MYCOBACTERIUM TUBERCULOSIS H 37 RV
[Minimum inhibitory concentration expressed in mcg./ml.]

| Products | Mycobacterium tuberculosis H 37 RV | M.I.C. (mcg./ml.) | | Medium |
|---|---|---|---|---|
| | | 0.1 mg. KB | 0.01 mg. KB | |
| 10 939 | 6th day | 10 | 1.25 | Youmans. |
| | 12th day | 10 | 10 | |
| | 18th day | 10 | 10 | |
| 11 380 | 6th day | 1.25 | 0.75 | Do. |
| | 12th day | 5 | 2.5 | |
| | 18th day | >10 | 2.5 | |
| 11 295 | 6th day | 0.75 | 0.75 | Do. |
| | 12th day | 10 | 5 | |
| | 18th day | 10 | 5 | |
| 11 393 | 6th day | 0.75 | 0.1 | Do. |
| | 12th day | 2.5 | 0.1 | |
| | 18th day | 10 | 1.25 | |
| 11 394 | 6th day | 0.75 | 0.75 | Do. |
| | 12th day | 1.25 | 0.75 | |
| | 18th day | 2.5 | 1.25 | |

TABLE II.—Continued
[Minimum inhibitory concentration expressed in mcg./ml.]

| Products | Mycobacterium tuberculosis H 37 RV | M.I.C. (mcg./ml.) | | medium |
|---|---|---|---|---|
| | | 0.1 mg. KB | 0.01 mg. KB | |
| 11 438 | 6th day | 0.75 | 0.15 | Do. |
| | 12th day | 5 | 1.25 | |
| | 18th day | 10 | 1.0 | |
| 11 439 | 6th day | 0.75 | 0.15 | Do. |
| | 12th day | 1.25 | 0.75 | |
| | 18th day | 5 | 0.75 | |
| 11 440 | 6th day | 0.1 | 0.1 | Do. |
| | 12th day | 0.75 | 0.25 | |
| | 18th day | 1.25 | 0.75 | |
| 11 500 | 6th day | 0.75 | 0.75 | Do. |
| | 12th day | 1.25 | 0.75 | |
| | 18th day | 2.5 | 1.25 | |
| 11 435 | 6th day | 0.75 | 0.75 | Do. |
| | 12th day | 1.25 | 2.5 | |
| | 18th day | 5 | 5 | |
| 11 313 | 6th day | 0.15 | ≤0.05 | Do. |
| | 12th day | 1.25 | 0.1 | |
| | 18th day | 1.25 | 0.15 | |

TABLE II.—Continued

[Minimum inhibitory concentration expressed in mcg./ml.]

| Products | Mycobacterium tuberculosis H 37 RV | M.I.C. (mcg./ml.) 0.1 mg. KB | M.I.C. (mcg./ml.) 0.01 mg. KB | Medium |
|---|---|---|---|---|
| 11 327 | 6th day | 10 | 5 | Do. |
|  | 12th day | 10 | 5 |  |
|  | 18th day | 10 | 10 |  |
| 11 501 | 6th day | 0.25 | 0.25 | Do. |
|  | 12th day | 0.75 | 0.25 |  |
|  | 18th day | 1.25 | 0.75 |  |
| 11 546 | 6th day | >10 | >10 | Do. |
|  | 12th day |  |  |  |
|  | 18th day |  |  |  |
| 11 547 | 6th day | 0.75 | 0.25 | Do. |
|  | 12th day | 1.25 | 1.25 |  |
|  | 18th day | 5 | 2.5 |  |
| 11 548 | 6th day | 10 | 1.25 | Do. |
|  | 12th day | 10 | 5 |  |
|  | 18th day | 10 | 10 |  |
| 11 532 | 6th day | 10 | 2.5 | Do. |
|  | 12th day | 10 | 5 |  |
|  | 18th day | 10 | 10 |  |
| 11 551 | 6th day | 5 | 2.5 | Do. |
|  | 12th day | 10 | 2.5 |  |
|  | 18th day | 10 | 10 |  |
| 11 553 | 6th day | 0.15 | 0.1 | Do. |
|  | 12th day | 0.75 | 0.1 |  |
|  | 18th day | 1.25 | 0.75 |  |
| 11 601 | 6th day | >10 | 10 | Do. |
|  | 12th day |  | >10 |  |
|  | 18th day |  |  |  |
| 11 642 | 6th day | >10 | >10 | Do. |
|  | 12th day |  |  |  |
|  | 18th day |  |  |  |
| 11 665 | 6th day | 10 | 10 | Do. |
|  | 12th day | >10 | >10 |  |
|  | 18th day |  |  |  |
| 11 663 | 6th day | 10 | 5 | Do. |
|  | 12th day | >10 | 10 |  |
|  | 18th day |  | >10 |  |
| 11 664 | 6th day | 10 | 10 | Do. |
|  | 12th day | >10 | >10 |  |
|  | 18th day |  |  |  |
| 11 643 | 6th day | 5 | 2.5 | Do. |
|  | 12th day | 10 | 10 |  |
|  | 18th day | >10 | 10 |  |
| 11 682 | 6th day | >10 | 10 | Do. |
|  | 12th day |  | >10 |  |
|  | 18th day |  |  |  |
| 11 681 | 6th day | 10 | 10 | Do. |
|  | 12th day | >10 | >10 |  |
|  | 18th day |  |  |  |
| 11 242 | 6th day | 5 | 2.5 | Do. |
|  | 12th day | 5 | 2.5 |  |
|  | 18th day | 10 | 2.5 |  |
| 11 425 | 6th day | 2.5 | 0.75 | Do. |
|  | 12th day | 5 | 0.75 |  |
|  | 18th day | 5 | 0.75 |  |
| 11 430 | 6th day | 1.25 | 0.75 | Do. |
|  | 12th day | 2.5 | 1.25 |  |
|  | 18th day | 2.5 | 2.5 |  |
| 11 431 | 6th day | 0.75 | 0.15 | Do. |
|  | 12th day | 2.5 | 1.25 |  |
|  | 18th day | 5 | 2.5 |  |
| 11 432 | 6th day | 0.25 | 0.15 | Do. |
|  | 12th day | 1.25 | 0.75 |  |
|  | 18th day | 2.5 | 2.5 |  |
| 11 433 | 6th day | 0.75 | 0.75 | Do. |
|  | 12th day | 2.5 | 1.25 |  |
|  | 18th day | 5 | 2.5 |  |
| 11 434 | 6th day | 0.75 | 0.75 | Do. |
|  | 12th day | 5 | 1.25 |  |
|  | 18th day | 10 | 2.5 |  |
| 11 436 | 6th day | 0.75 | ≤0.05 | Do. |
|  | 12th day | 0.75 | 0.75 |  |
|  | 18th day | 2.5 | 1.25 |  |
| 11 552 | 6th day | 5 | 2.5 | Do. |
|  | 12th day | 5 | 2.5 |  |
|  | 18th day | 10 | 2.5 |  |
| 11 600 | 6th day | 5 | 2.5 | Do. |
|  | 12th day | 5 | 5 |  |
|  | 18th day | 5 | 5 |  |
| 11 683 | 6th day | 5 | 5 | Do. |
|  | 12th day | 10 | 5 |  |
|  | 18th day | 10 | 10 |  |
| 11 680 | 6th day | 5 | 5 | Do. |
|  | 12th day | >10 | 5 |  |
|  | 18th day |  | 10 |  |

TABLE III.—ACTION OF 11 380 CB ON THE MOBILITY "IN VITRO" OF TREPONEMA PALLIDUM (REITER STRAIN)

[Percentage of the initial number]

| Product | Dose, mcg./ml. | 30 min. | 60 min. | 120 min. | 3 hrs. | 17 hrs. | 24 hrs. |
|---|---|---|---|---|---|---|---|
| 11 380 CB | 0 | 90 | 80 | 76 | 86 | 72 | 90 |
|  | 0.4 | 46 | 36 | 24 | 6 | 0 | 0 |
|  | 0.8 | 42 | 38 | 16 | 4 | 0 | 0 |
|  | 1.56 | 32 | 34 | 14 | 0 | 0 | 0 |

TABLE IV.—EXPERIMENTAL DISEASES IN RATS

[Survival per 100]

| Dose, mg./kg. | Staphylococcosis | | | | Streptococcosis | | | | Listerellosis | | | | Erysipelas | | | | Klebsiellosis | | | | Pasteurellosis | | | | Salmonellosis | | | |
|---|---|---|---|---|---|---|---|---|---|---|---|---|---|---|---|---|---|---|---|---|---|---|---|---|---|---|---|---|
|  | 75 | 100 | 150 | 200 | 75 | 100 | 150 | 200 | 75 | 100 | 150 | 200 | 75 | 100 | 150 | 200 | 75 | 100 | 150 | 200 | 75 | 100 | 150 | 200 | 75 | 100 | 150 | 200 |
| Products: |  |  |  |  |  |  |  |  |  |  |  |  |  |  |  |  |  |  |  |  |  |  |  |  |  |  |  |  |
| 11 380 | 80 | 90 | 90 | 95 | 90 | 95 | 100 | 100 | 50 | 60 | 70 | 80 | 35 | 40 | 75 | 90 | 35 | 60 | 75 | 80 | 75 | 85 | 95 | 100 | 75 | 85 | 100 | 100 |
| 11 295 | 100 | 100 | 85 | 100 | 95 | 100 | 100 | 70 | 10 | 30 | 35 | 55 | 30 | 40 | 60 | 70 | 0 | 0 | 45 | 50 | 10 | 15 | 40 | 40 | 90 | 90 | 100 | 100 |
| 10 039 |  |  |  |  | 30 | 50 | 60 | 30 | 10 | 10 | 20 | 30 | 0 | 0 | 0 | 0 | 0 | 0 | 10 | 0 | 0 | 20 | 30 | 50 | 0 | 75 | 95 | 100 |
| 11 393 |  |  |  |  | 0 | 0 |  |  | 10 |  |  |  | 0 | 0 |  |  | 0 |  |  |  |  |  |  |  | 0 | 0 |  |  |
| 11 394 |  |  |  |  | 0 | 0 |  |  |  |  |  |  | 0 | 0 |  |  | 0 | 0 |  |  | 0 | 0 |  |  | 0 | 0 |  |  |
| 11 532 |  |  |  |  |  |  |  |  |  |  |  |  | 0 | 0 |  |  | 0 |  |  |  |  |  |  |  |  |  |  |  |
| 11 736 |  |  |  |  |  |  |  |  |  |  |  |  |  |  |  |  |  |  |  |  | 0 | 0 |  |  |  |  |  |  |

TABLE V.—ACTION OF 11 380 CB ON EXPERIMENTAL SYPHILIS IN RABBITS

| Days | Severity of testicular syphiloma | | | | | | Detection of treponema in days after inoculation | | | | Serological reactions | | | | | |
|---|---|---|---|---|---|---|---|---|---|---|---|---|---|---|---|---|
| | 9 | 15 | 22 | 35 | 50 | 150 | 9 | 15 | 22 | 35 | 9 | 15 | 22 | 35 | 50 | 150 |
| Batch: | | | | | | | | | | | | | | | | |
| Controls | + | ++ | ++ | ++ | + | | ++ | +++ | +++ | +++ | ++ | ++ | +++ | ++++ | ++++ | + |
| 11 380 CB, 100 mg./kg. | + | ++ | + | + | ± | — | ++ | +++ | ± | — | ++ | ++ | ++ | ++ | + | — |
| 11 380 CB, 200 mg./kg. | + | ++ | ± | ± | — | — | ++ | +++ | ± | — | ++ | ++ | ++ | + | — | — |

TABLE VI.—SERIAL CONCENTRATIONS IN RATS

| Products | Dose, P.O. | Concentration, mcg./ml. at— | | | | | |
|---|---|---|---|---|---|---|---|
| | | 30 min. | 60 min. | 90 min. | 2 hrs. | 3 hrs. | 4 hrs. |
| 11 380 | 200 | 3.2 | 1.2 | | 0.56 | 0.5 | 0.38 |
| 11 295 | 150 | 0.5 | 1.5 | 0.4 | 0.32 | 0.4 | 0.2 |
| 10 939 | 150 | 0 | 0.4 | 0.6 | 1.36 | 0.2 | 0 |

TABLE VIb.—SERIAL CONCENTRATIONS IN DOGS

| Products | Dose, (P.O.), mg./kg. | Concentration, mcg./ml. at— | | | | | |
|---|---|---|---|---|---|---|---|
| | | 30 min. | 60 min. | 90 min. | 2 hrs. | 3 hrs | 4 hrs |
| 11 380 | 150 | 3.2 | 1.18 | 1.56 | 0.57 | 0.50 | 0.38 |
| 11 295 | 150 | | 0.82 | 1.53 | 0.3 | | |

TABLE VII.—URINARY CONCENTRATIONS IN RATS

| Products | Dose, (P.O.) mg./kg. | Percent elimination at 6 hours | Percent elimination at 24 hours |
|---|---|---|---|
| 11 380 | 100 | 0.11 | 0.16 |
| 11 295 | 100 | 0.14 | 0.18 |
| 10 939 | 100 | Traces | |

I claim:

1. A compound having the formula

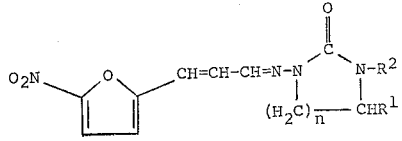

in which $n$ is an integer which is at least 1, but less than 3, $R^1$ is hydrogen, and $R^2$ is selected from the group consisting of N-methylcarbamoyl and N-ethylcarbamoyl.

2. The compound of claim 1 wherein $R^2$ is N-methylcarbamoyl.

3. The compound of claim 1 wherein $R^2$ is N-ethylcarbamoyl.

References Cited

UNITED STATES PATENTS 3,041,334    6/1962    Klein _____ 260—240 A

FOREIGN PATENTS 1,117,589    5/1962    Germany _____ 260—240 A
515,245    11/1952    Belgium _____ 260—240 A
759,378    10/1956    Great Britain _____ 260—240 A JOHN D. RANDOLPH, Primary Examiner U.S. Cl. X.R.

424—273, 285; 260—240 G, 251, 309.7